(12) United States Patent
Puppala et al.

(10) Patent No.: US 11,379,262 B2
(45) Date of Patent: Jul. 5, 2022

(54) CASCADING OF GRAPH STREAMING PROCESSORS

(71) Applicant: ThinCI, Inc., El Dorado Hills, CA (US)

(72) Inventors: Venkata Ganapathi Puppala, Hyderabad (IN); Sarvendra Govindammagari, Hyderabad (IN); Lokesh Agarwal, Hyderabad (IN); Satyaki Koneru, Folsom, CA (US)

(73) Assignee: Blaize, Inc., El Dorado Hills, CA (US)

( * ) Notice: Subject to any disclaimer, the term of this patent is extended or adjusted under 35 U.S.C. 154(b) by 805 days.

(21) Appl. No.: 16/282,464

(22) Filed: Feb. 22, 2019

(65) Prior Publication Data

US 2019/0188038 A1 Jun. 20, 2019

Related U.S. Application Data

(63) Continuation-in-part of application No. 16/270,766, filed on Feb. 8, 2019, now Pat. No. 11,150,961, and a continuation-in-part of application No. 15/164,848, filed on May 25, 2016, now Pat. No. 10,437,637.

(60) Provisional application No. 62/166,507, filed on May 26, 2015.

(51) Int. Cl.
| | |
|---|---|
| *G06T 1/20* | (2006.01) |
| *G06F 9/48* | (2006.01) |
| *G06F 8/41* | (2018.01) |
| *G06F 9/38* | (2018.01) |

(52) U.S. Cl.
CPC .............. *G06F 9/4881* (2013.01); *G06F 8/45* (2013.01); *G06F 9/3851* (2013.01); *G06F 9/3885* (2013.01); *G06T 1/20* (2013.01)

(58) Field of Classification Search
CPC ........ G06F 9/4881; G06F 8/45; G06F 9/3851; G06F 9/3885; G06T 1/20
USPC ......................................................... 345/505
See application file for complete search history.

(56) References Cited

U.S. PATENT DOCUMENTS

| | | | |
|---|---|---|---|
| 7,140,019 | B2 | 11/2006 | May et al. |
| 7,856,544 | B2 | 12/2010 | Schenfeld et al. |
| 8,094,158 | B1 | 1/2012 | Allen et al. |
| 8,291,006 | B2 | 10/2012 | Andrade et al. |
| 9,367,658 | B2 | 6/2016 | Pell et al. |
| 10,423,558 | B1 | 9/2019 | Fukami et al. |

(Continued)

*Primary Examiner* — Jin Ge
(74) *Attorney, Agent, or Firm* — Brian R. Short

(57) ABSTRACT

Methods, systems and apparatuses for graph stream processing are disclosed. One apparatus includes a cascade of graph streaming processors, wherein each of the graph streaming processor includes a processor array, and a graph streaming processor scheduler. The cascade of graph streaming processors further includes a plurality of shared command buffers, wherein each shared command buffer includes a buffer address, a write pointer, and a read pointer, wherein for each of the plurality of shared command buffers a first graph streaming processor writes commands to the shared command buffer as indicated by the write pointer of the shared command buffer and a second graph streaming processor reads commands from the shared command buffer as indicated by the read pointer, wherein at least one graph streaming processor scheduler operates to manage the write pointer and the read pointer to avoid overwriting unused commands of the shared command buffer.

10 Claims, 10 Drawing Sheets

(56) References Cited

U.S. PATENT DOCUMENTS

| | | |
|---|---|---|
| 2005/0060518 A1 | 3/2005 | Augsburg et al. |
| 2006/0149938 A1 | 7/2006 | Jiang et al. |
| 2011/0072211 A1* | 3/2011 | Duluk, Jr. ............... G06F 9/461 345/522 |
| 2011/0087864 A1* | 4/2011 | Duluk, Jr. ............. G06F 9/3887 712/220 |
| 2011/0289507 A1 | 11/2011 | Khan et al. |
| 2013/0013898 A1 | 1/2013 | Merten et al. |
| 2013/0036409 A1 | 2/2013 | Auerbach et al. |
| 2013/0212341 A1* | 8/2013 | Tardif ................... G06F 3/0656 711/154 |
| 2013/0305258 A1* | 11/2013 | Durant ................. G06F 9/4881 718/106 |
| 2014/0130023 A1 | 5/2014 | Chen et al. |
| 2014/0176588 A1 | 6/2014 | Dulak, Jr. et al. |
| 2014/0181806 A1 | 6/2014 | Abiezzi et al. |
| 2014/0282601 A1 | 9/2014 | Abdallah et al. |
| 2016/0246599 A1 | 8/2016 | Johnson |
| 2016/0291982 A1 | 10/2016 | Mizrahi et al. |
| 2018/0300933 A1 | 10/2018 | Burke et al. |
| 2018/0308195 A1 | 10/2018 | Vembu et al. |

\* cited by examiner

| Command Buffer Size - 0 | Command Buffer WP - 0 | Command Buffer RP - 0 |
| --- | --- | --- |
| Command Buffer Size - 1 | Command Buffer WP - 1 | Command Buffer RP - 1 |
| . . | . . | |
| Command Buffer Size - N | Command Buffer WP - N | Command Buffer RP - N |

FIGURE 3

Scheduling, by a thread manager of each of a plurality of graph streaming processors, a plurality of treads operating on an array of processors of the graph streaming processor.
610

Interpreting, by an input command buffer parser of each stage of a plurality of physical hardware stages of the thread manager, commands within a corresponding input command buffer located between the stage and a previous stage
620

Generating the plurality of threads based on the interpreted commands
630

Writing, by a first graph streaming processor of the plurality of graph streaming processors, commands to a first shared command buffer as indicated by the write pointer
640

Reading, by a second graph streaming processor of the plurality of graph streaming processors, command from the first shared command buffer and indicated by the read pointer, comprising interpreting, by an input command buffer parser of a first physical hardware stage of a thread manager of the second graph streaming processor, commands within the first shared command buffer
650

Managing the write pointer and the read pointer to avoid overwriting unused commands of the shared command buffer
660

FIGURE 6

CASCADING OF GRAPH STREAMING PROCESSORS

RELATED APPLICATIONS

This patent application is a continuation-in-part (CIP) of U.S. patent application Ser. No. 16/270,766, filed Feb. 8, 2019, and this patent application is a continuation-in-part (CIP) of U.S. patent application Ser. No. 15/164,848, filed May 25, 2016, which claims priority to provisional patent application 62/166,507, filed May 26, 2015, which are all herein incorporated by reference.

FIELD OF THE EMBODIMENTS

The described embodiments relate generally to graph streaming processing. More particularly, the described embodiments relate to methods, apparatuses and systems for cascading graph streaming processors.

BACKGROUND

The onset of computation heavy applications is causing a paradigm shift from centralized computing to parallel and distributed computing. Parallel computing includes distributing computing jobs to the various computing resources. These resources include several central processing units (CPU), memory, storage, and support for networking.

Centralized computing works well in many applications, but falls short in the execution of computation rich applications, which are increasingly popular. Programs can be executed in a serial fashion or distributed to be executed on multiple processors. When programs are executed in a serial fashion, only one processor can be utilized and hence the throughput is limited to the speed of the processor. Such systems with one processor are adequate for many applications but not for compute intensive applications. Code can be executed in parallel in multi-processor systems leading to higher throughput. Multi-processor systems entail breaking of code into smaller code blocks and efficiently managing the execution of code. In order for the processors to execute in parallel, data to each of the processors has to be independent. Instances of a same code block can be executed on several processors simultaneously to improve the throughput.

It is desirable to have a method, apparatus and system for improved graph stream processing.

SUMMARY

One embodiment includes a cascade of graph streaming processors. The cascade of graph streaming processors includes a plurality of graph streaming processors, wherein each of the graph streaming processor includes a processor array and a thread manager. The thread manager includes a plurality of stages and a plurality of command buffers located between each of the plurality of stages, wherein each stage includes physical hardware operative to schedule each of a plurality of threads of the stage, including an input command buffer parser operative to interpret commands within a corresponding input command buffer and generate the plurality of threads. The cascade of graph streaming processors further includes one or more shared command buffers located between each of the plurality of graph streaming processors, wherein each shared command buffer includes a buffer address, a write pointer, and a read pointer, wherein for each of the shared command buffers a first graph streaming processor of the plurality of graph streaming processors operates to write commands to the shared command buffer as indicated by the write pointer of the shared command buffer and a second graph streaming processor of the plurality of graph streaming processors operates to read commands from the shared command buffer as indicated by the read pointer by interpreting commands of the shared command buffer by an input command buffer parser of a first stage of the second graph streaming processor. For each one of the shared command buffers, at least one graph streaming processor scheduler operates to manage the write pointer and the read pointer to avoid overwriting unused commands of the shared command buffer.

Another embodiment includes a method of graph processing. The method includes processing scheduling, by a thread manager of each of a plurality of graph streaming processors, a plurality of threads operating on an array of processors of the graph streaming processor. The scheduling includes interpreting, by an input command buffer parser of each stage of a plurality of physical hardware stages of the thread manager, commands within a corresponding input command buffer located between the stage and a previous stage, and generating the plurality of threads based on the interpreted commands. A shared command buffer is located between each of the plurality of graph streaming processors, wherein the shared command buffer includes a buffer address, a write pointer, and a read pointer. The method additionally includes writing, by a first graph streaming processor of the plurality of graph streaming processors, commands to a shared command buffer as indicated by the write pointer, reading, by a second graph streaming processor of the plurality of graph streaming processors, commands from the shared command buffer and indicated by the read pointer, comprising interpreting, by an input command buffer parser of a first physical hardware stage of a thread manager of the second graph streaming processor, commands within the shared command buffer, and managing the write pointer and the read pointer to avoid overwriting unused commands of the shared command buffer.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 3 is a table that includes entries of a command state array, according to an embodiment.

FIG. 6 is a flow chart that includes steps of a method of graph stream processing, according to an embodiment.

DETAILED DESCRIPTION

Figure 1:
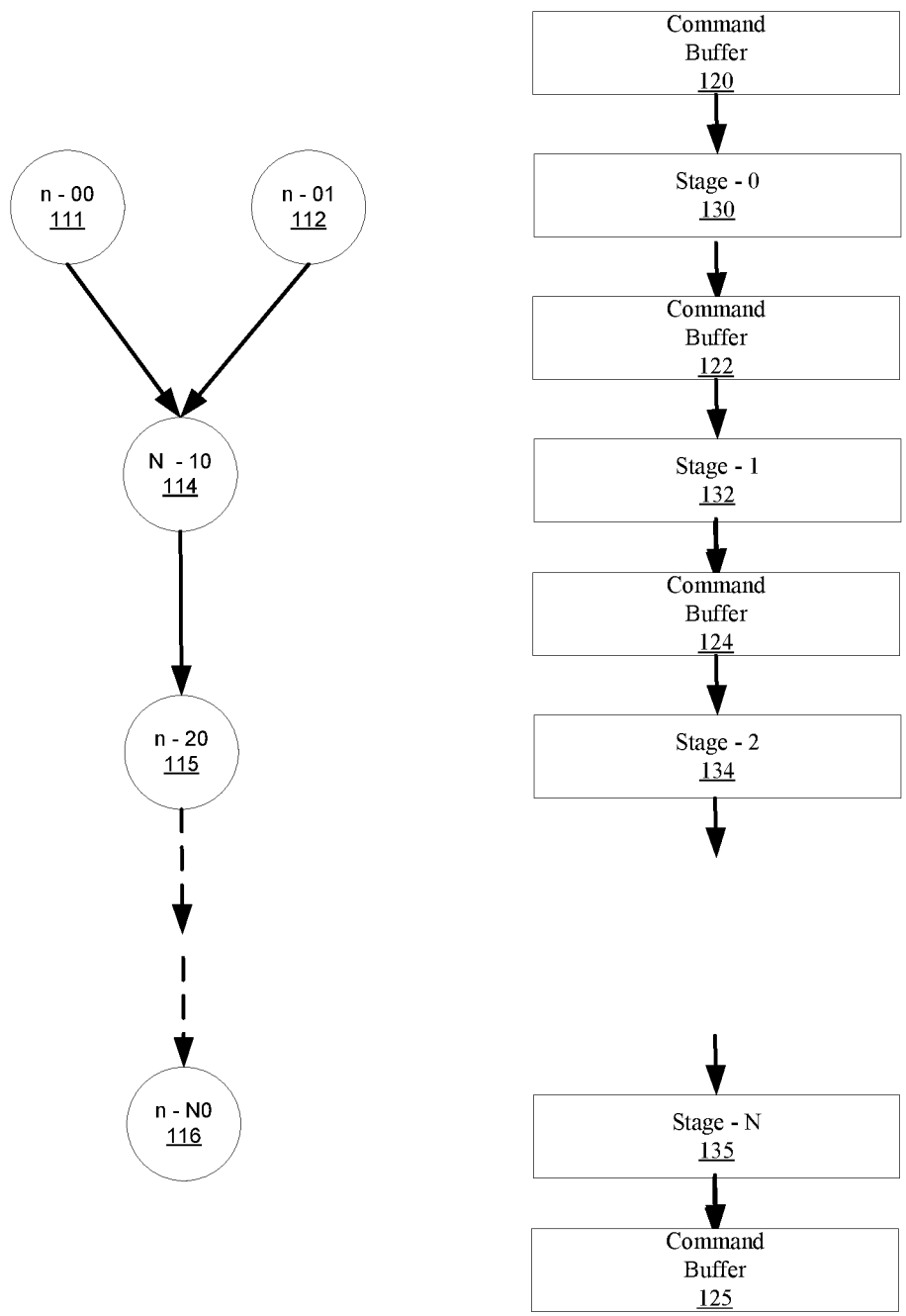
FIG. 1 shows an acyclic graph mapped to stages of a graph streaming processor, according to an embodiment.

The described embodiments are embodied in methods, apparatuses and systems for cascading a plurality of GSPs (graph streaming processors). For an embodiment, a shared command buffer is located between at least two of the plurality of GSPs. For an embodiment, the plurality of GSPs includes a GSP scheduler for managing writing and reading commands to and from the shared command buffer. For an embodiment, the GSP scheduler operates to ensure that unprocessed write commands of the shared command buffer are not overwritten. Further, for an embodiment, a last stage of a first GSP writes the commands into the shared command buffer and a first stage of a second GSP reads the commands from the shared command buffer. For an embodiment, the first stage of the second GSP includes a physical piece of hardware in a thread manager of the second GSP which is responsible for scheduling the threads. For an embodiment, each stage includes an input command buffer parser, wherein the input command buffer parser generates the threads of the stage based upon commands of a command buffer located between the stage and the previous stage. That is, the first stage of the second GSP generates threads based on the commands of the shared command buffer located between the first stage of the second GSP and the last stage of the first GSP. The command buffers have commands written into them that provides parallel processing and trigger threads for later occurring stages.

Certain computation situations include computational demands that suggest that cascading of multiple GSPs is useful or desirable. For example, cascading of GSP helps in executing applications with a large number of physical stages. Further, cascading of GSPs can be useful for operating with self-scheduling of the processing by the GSPs without requiring much external software control when executing applications that are highly computationally intensive.

At least some embodiments of Graph Streaming Processor (GSP) architectures are designed for execution of an acyclic data flow graph in a streaming manner. For at least some embodiments, the acyclic flow graph includes connected nodes, wherein the nodes are connected by arcs. For an embodiment, the arcs between the nodes of the acyclic flow graph indicate the dependency between the nodes. For an embodiment, a node includes one or more threads operative on a plurality of processors.

A thread may be dependent on data generated by other threads of the same node, and/or data generated by threads of other nodes. For an embodiment, each node is processed at a depth (wherein the depth merely refers to the relative timing of one stage relative to another stage), which can be represented by an acyclic graph. For an acyclic graph as represented by the complex dependent graph of FIG. 1, a node is dependent only on nodes at a lower (that is, dispatched earlier in time from a previous stage) or same depth (dispatched earlier in time but from the same stage).

For at least some embodiments of GSP, a thread scheduler is responsible for scheduling and management of all the threads and tasks running in an execution core of the GSP.

FIG. 1 shows an acyclic graph mapped to stages of a graph streaming processor, according to an embodiment. For the example shown in FIG. 1, stage-0 is responsible for dispatching threads of the nodes n-00 (111) and n-01 (112). Further, stage-1 schedules the threads for the node n-10 (114), and the stage-2 schedules the threads of for the node n-20 (115), so on and so forth. The last stage of the pipeline is stage-N which schedules the threads for the node n-N0 (116), where is N is fixed for a specific GSP.

For an embodiment, a command buffer 120, 122, 124, 125 is located before, after, and between each of the stages 130, 132, 134, 135. For an embodiment, each command buffer 120, 122, 124, 125 consist of commands. As described, each stage writes the commands to the command buffer of the subsequent stage.

For an embodiment, for the stage-0, processing on a host (for example, a host central processing unit (CPU)) populates the command buffer-0 and initiates the processing. For an embodiment, the stage-0 (130) starts scheduling the threads by parsing the commands of the command buffer-0 (120) (for node-00 and node-01 in the example), as the threads are processed by the graph streaming processor, if the dependencies are met, stage-0 writes the commands to its output command buffer i.e. command buffer-1. The Stage-1 then begins parsing the command buffer-1 (122) and the execution continues in a pipelined manner. The streams of a stage commence after the completion of at least one thread of the previous stage, and complete at least one thread before the next stage. Accordingly, for at least some embodiments, multiple stages are simultaneously processing threads of the stage. However, streams of a stage can commence and complete at different times within the stage.

For at least some embodiments, a stage of the graph stream processing includes a physical piece of hardware in a thread manager which is responsible for scheduling the threads corresponding to the node(s) at a particular depth (as determined by timing of the stage relative to other stages) in the graph. For an embodiment, the stage includes an input command buffer parser, wherein the command buffer parser generates the threads of the stage based upon commands of a command buffer located between the stage and the previous stage. For an embodiment, the input command buffer parser is implemented in hardware, and threads of the stage operate on a plurality of thread processors, and a command buffer is located between each stage.

For an embodiment, a thread can only be dependent on threads of an earlier stage, or threads of the same stage that have been dispatched earlier. For an embodiment, a thread cannot be dependent on a thread of the same stage that starts later.

As described, for an embodiment, a thread includes a set of instructions operating on input data and producing output data. A node can include multiple threads wherein all threads run the same set of instructions but operate on different data. For an embodiment, the threads are executed on a plurality of thread processors.

As previously described, each stage includes an input command buffer parser, wherein the command buffer parser generates the threads of the stage based upon commands of a command buffer located between the stage and the previous stage. Further, a temporal relationship exists between threads of a common stage.

Figure 2:
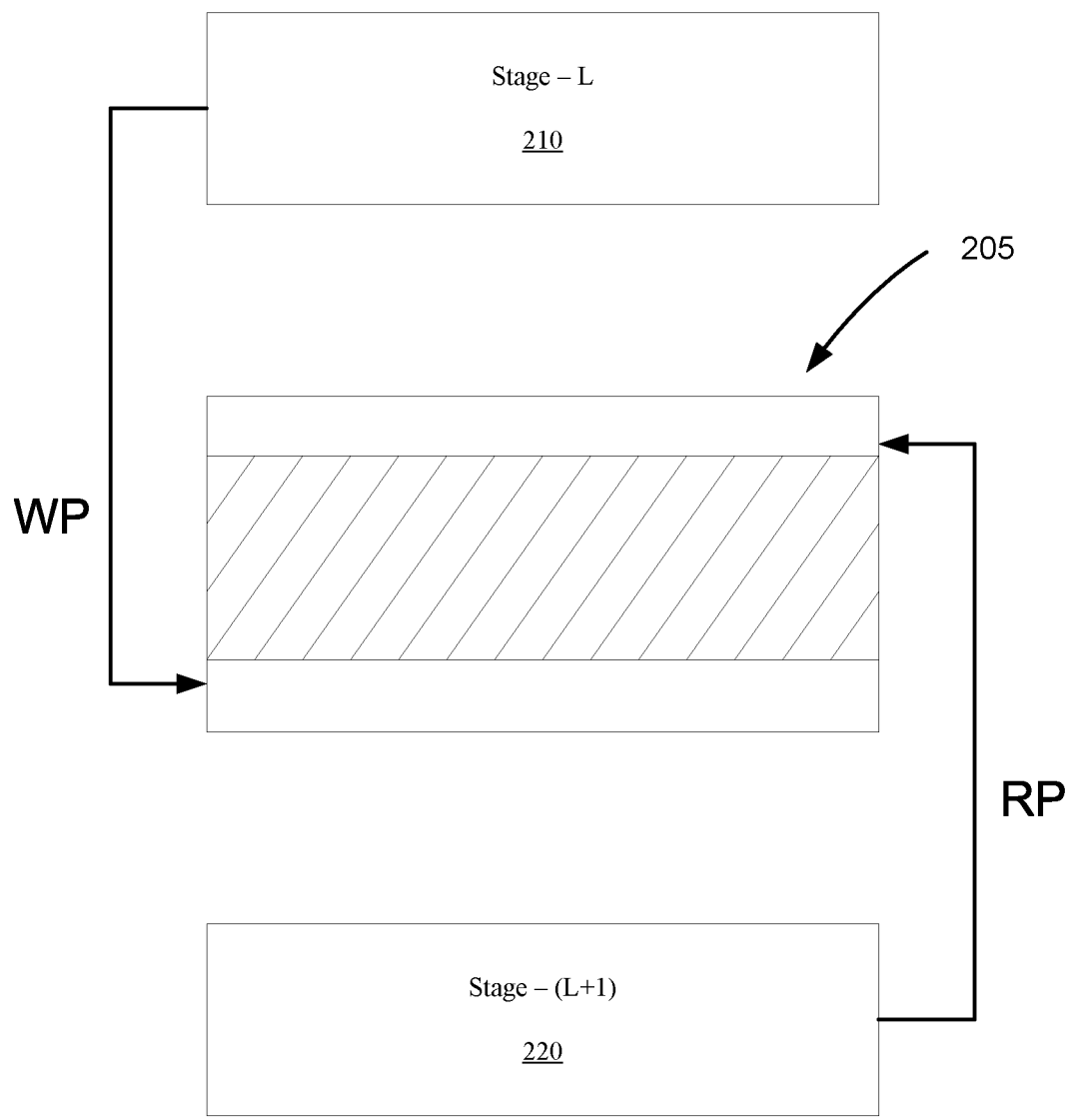
FIG. 2 shows operation of a command buffer located between two physical stages of a graph streaming processor, according to an embodiment.

FIG. 2 shows operation of a command buffer 205 located between two physical stages of a graph streaming processor, according to an embodiment. For an embodiment, the thread scheduler of the GSP maintains a set of pointers to track the command buffer between two stages. For an embodiment, these pointers are stored in memory in an array called command state array. For an embodiment, the number of entries in command state array is equal to the number of stages present in the GSP processor.

For an embodiment, the command state array consists of a pointer of the command buffer location until the position the top stage 210 (Stage-L in FIG. 2) has written commands, called "WP—Write Pointer", and the pointer of command buffer location until the position the bottom stage 220 (Stage-L+1 in FIG. 2) parsed the commands and dispatched the threads, called "RP—read pointer". When the pointers are not equal, there are more commands written by the top stage and yet to be dispatched by the bottom stage. The command buffer is full, when the difference between the pointers equal to the command buffer size.

FIG. 3 is a table that includes entries of a command state array, according to an embodiment. Each row of the table includes a command buffer identifier, and the corresponding write pointer and read pointer for the command buffer.

As previously alluded to, there exist scenarios in which a single GSP may not be sufficient to process the whole graph as a single entity. The scenarios include, for example, the data flow graph requires more physical stages than the stages present in one GSP processor chip, and/or the computational power required is more than single GSP processor chip can offer.

The described embodiments that include a cascade of multiple GSPs offer more physical stages and more computational power enabling data streaming between the processors with no host software intervention, thereby avoid all the overhead involved in the work generation by the host software by splitting the graph and executing and synchronizing the subgraphs running on multiple GSP chips. In other words, cascading of GSPs extends the ability of self-scheduling of work not only between the stages of single GSP but also between multiple GSPs.

Figure 4:
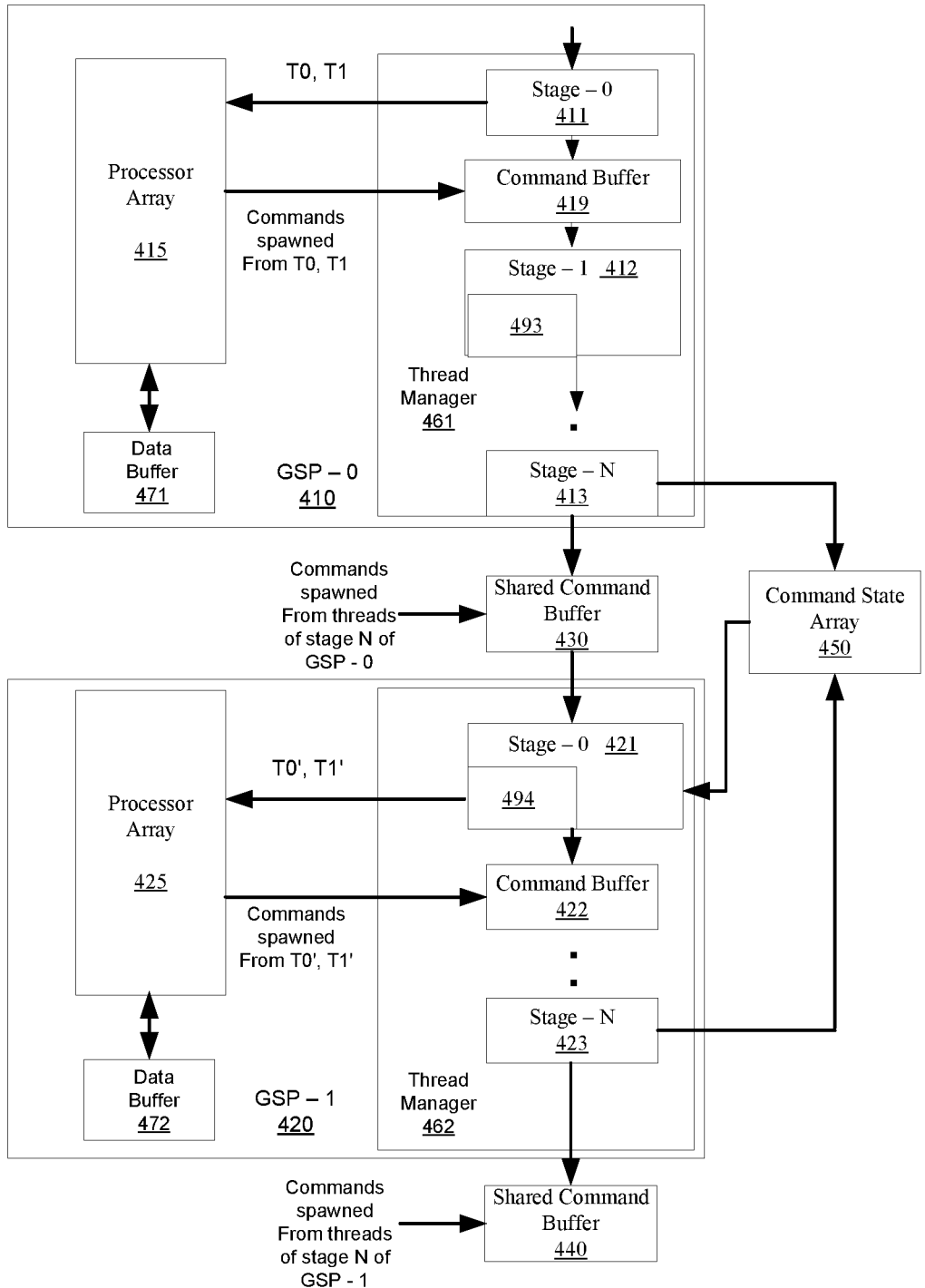
FIG. 4 shows cascaded graph streaming processors, according to an embodiment.

FIG. 4 shows cascaded graph streaming processors GSP-0 (410), GSP-1 (420), according to an embodiment. For an embodiment, the graph streaming processor-0 (410) includes a processor array 415, and a thread manager (graph streaming processor scheduler) 461 that includes a plurality of stages 411, 412, 413. For an embodiment, another graph streaming processor-1 (420) includes a processor array 425, and another thread manager (a graph streaming processor scheduler) 463 that includes a plurality of stages 421, 423.

For an embodiment, each graph streaming processor 410, 420 operatives to process a plurality of threads of the plurality of thread processor arrays 415, 425, wherein processing of at least one of the threads is dependent upon processing of another of the plurality of threads. As previously described, each thread includes a set of instructions operating on the plurality of thread processor arrays 415, 425 and operating on a set of data and producing output data, The graph streaming processors 410, 420 each include thread managers (also referred to as GSP Schedulers) 461, 463, wherein the thread managers 461, 463 operate to dispatch operation of the plurality of threads (T0, T1, T0', T1') of the plurality of thread processor arrays 415, 425.

For an embodiment, the thread managers 461, 463 include stages. That is, the thread manager 461 includes the stages 411, 412, 413, and the thread managers 463 include stages 421, 423. For an embodiment, each of the stages includes an interface to a command buffer of a previous stage to an input command buffer of the stages. That is, for example, the stage 412 includes an input command buffer parser 493 which is interfaced to a command buffer 419. In operation, commands are stored in the command buffer 419 by the stage 411. The input command buffer parser 493 of the stage 412 generates streams of the stage 412 based upon the commands stored in the command buffer 419. Further, for example, the stage 421 includes an input command buffer parser 494 which is interfaced to the shared command buffer 430. In operation, commands are stored in the shared command buffer 430 by the stage 413. The input command buffer parser 494 of the stage 421 generates streams of the stage 421 based upon the commands stored in the shared command buffer 430.

As previously described, for an embodiment, each stage (such as shown in stages 412, 415) of the graph streaming processor includes a physical piece of hardware in the GSP scheduler (thread manager) which is responsible for scheduling the threads. For an embodiment, each stage includes the input command buffer parser (such as, input command buffer parsers 493, 494) wherein the input command buffer parser generates the threads of the stage based upon commands of a command buffer located between the stage and the previous stage. The command buffers have command written into them that provides parallel processing and trigger threads for later occurring stages.

As previously described, the plurality of threads run on the plurality of thread processors of the processor arrays 415, 425. For an embodiment, scheduling of a thread on the thread processors by the GSP schedulers (thread managers) 461, 463 is based on availability of resources including a thread slot on a thread processor of the plurality of thread processors, adequate space in the register file, space in the output command buffer for writing the commands produced by the spawn instructions.

Further, as described, a compiler splits up an initial program into code-blocks to enable/optimize task parallelism of the processing. Each of these code-blocks is a set of instructions and along with its inputs and outputs, identifies a stage for which one or more threads can be run. The thread is a code-block which is scheduled for operation on the plurality of thread processors. As previously described, each thread is a physical instance of a set of instructions (kernel/program/code-block) running on a set of data and producing output data. A kernel/program can be a code block of a larger program. For an embodiment, the compiler program splits up the program into code-blocks at points where the vector-ness/width of the code changes to enable/optimize task parallelism. The vector-ness/width indicates the degree of parallel processing.

For an embodiment, a node/task is the code-block along with the inputs, outputs. A node can be split up into one or more threads with each thread running the same code-block but on different data and producing different data. More than one node can be included within a stage. A graph can provide a visual dependency relationship between the nodes. For an embodiment, a stage is a physical piece of hardware in the thread manager which is responsible for scheduling the threads corresponding to the node/s at a particular depth (relative timing of the nodes) in the graph. The stage includes an input command buffer parser. The node generates threads based on the commands in the command buffer.

For the threads running on the processors have instructions embedded by the compiler to spawn/create downstream threads. The execution of these instructions results in commands which are placed in the output command buffer of the stage which in turn becomes the input command buffer for the next (later) stage. That is, for example, the stage 411 of the thread manager 461 of the GSP-0 410 provides, for example, threads T0, T1 for processing on the processor array 415. During processing and execution of the threads T0, T1, commands are spawned from processing of the threads T0, T1 on the processors array 415 that are provided to and stored in the command buffer 419 of the GSP-0 410. The similar process occurs as the stage 413 of the GSP-0 410 provides threads to the processor array 415, wherein processing of these threads on the processors array 415 generate commands that are spawned during the processing of the provided threads which are stored in the shared command buffer 430. During the processing of the threads within the processor array 415, data is stored and retrieved to and from data buffer 471.

Further, the stage 421 of the thread manager 462 of the GSP-1 420 generates threads T0', and T1' for processing on the processor array 425 based on parsing of the commands stored in the shared command buffer 430. During processing and execution of the threads T0', T1', commands are spawned that are provided to and stored in the command buffer 422 of the GSP-1 420. During the processing of the threads within the processor array 425, data is stored and retrieved to and from data buffer 472.

For an embodiment, the locations of the command buffers between the stages and the hardware implementation of the stages allows for substantial performance advantages over software implementations of the command buffers and schedulers (stages).

As shown in FIG. 4 and previously described, for an embodiment, the cascaded graph streaming processors include the plurality of shared command buffers 430, 440. For an embodiment, each shared command buffer 430, 440 include a buffer address, a write pointer, and a read pointer.

For an embodiment, the last stage 413 of the first GSP-0 (410) and the first stage 421 of the second GSP-1 (420) share the shared command buffer 430. For embodiments, the shared command buffer 430 can be physically located in memory of either of the GSPs 410, 420, but is located between the delineated stages 413, 421.

As previously described, for an embodiment, a thread scheduler of a GSP maintains a set of pointers to track the command buffer between two stages of the GSP. For an embodiment, these pointers are stored in memory in an array called a command state array. For an embodiment, the number of entries in command state array is equal to the number of stages present in the GSP processor. However, the cascaded plurality of GSPs of FIG. 4 includes multiple GSP processors, and accordingly a command state array exists for each of the GSPs. FIG. 4 further includes the command state array 450 which is shared between the GSPs 410, 420. For embodiments, the command state array 450 shared between the GSPs 410, 420 is included within memory of either of the GSPs 410, 420. For an embodiment, the command state array 450 operates to hold the attributes (base address, write pointer, read pointer) of the command buffers for the stages sequentially.

For an embodiment, the GSP-0 (410) writes commands to the shared command buffer 430 as indicated by the write pointer of the shared command buffer 430 and the GSP-1 (420) reads commands from the shared command buffer 430 as indicated by the read pointer.

For an embodiment, for each one of the shared command buffers (such as, shared command buffer 430), at least one graph streaming processor scheduler operates to manage the write pointer and the read pointer to avoid overwriting unused commands of the shared command buffer. For example, the GSP-0 (410) and the GSP-1 (420) operates to manage the write pointer and the read pointer of the shared command buffer 430 respectively to avoid overwriting unused commands of the shared command buffer 430.

For an embodiment, the first graph streaming processor for example GSP 0 (410) operates to provide an indication to the second graph streaming processor for example GSP-1 (420), that commands have been written such that the write pointer has progressed over greater than a selected percentage of the shared command buffer. That is, the indication informs the second graph streaming processor the allocated space of shared command buffer has been written with commands over a selected percentage of the allocated space of the shared command buffer. For a specific embodiment, this includes determining when the first GSP write pointers moves more than a threshold amount (for example, a $\frac{1}{4}^{th}$) of the size of the shared command buffer.

For an embodiment, the second graph streaming processor (for example GSP-1 (420)) reads the write pointer of the shared command buffer and determines how much of the shared command buffer the second graph streaming processor can read. That is, the second graph streaming processor reads the write pointer of the shared command buffer and determines how much of the shared command buffer the second graph streaming processor can process.

For an embodiment the first stage of the second GSP polls for previous stage's (in this case, the last stage of the first GSP) write pointer stored in the command state array, when the pointer is moved the second GSP starts parsing the commands and schedules the threads to the processor array. Once the first stage of the second GSP has parsed all the commands and scheduled threads, the polling for new write pointer begins again. To reduce the memory read bandwidth, the polling happens at regular timing intervals instead of continuous reads.

For an embodiment, when the command buffer appears full, the last stage of the first GSP polls for the read pointer in the command state array at regular intervals.

For an embodiment, the first graph streaming processor operates to read the read pointer of the shared command buffer when the write pointer matches a current read pointer of the first graph streaming processor, and the shared command buffer appears full.

For an embodiment, the second graph streaming processor dispatches threads based on parsing of the shared command buffer, wherein when the second graph streaming processor parses greater than a selected percentage of the shared command buffer, the second graph streaming processor updates the read pointer of the shared command buffer. For a specific embodiment, when the first stage of the second GSP parses $\frac{1}{4}^{th}$ of the command buffer and dispatches the threads, the second GSP updates the dispatch pointer in the command state array.

For an embodiment, updating the read pointer of the shared command buffer enables the first graph streaming processor to only overwrite commands that have been processed by the second graph streaming processor.

For an embodiment, the first graph streaming processor writes a terminal index command to the shared command buffer when the processing of the first graph streaming processor is complete. For an embodiment, the terminal index command provides a way for the first graph streaming processor to indicate completion of forwarding of all commands to the second graph streaming processor.

For an embodiment, the polling interval can be made configurable. For an embodiment, polling by the second Graph Streaming Processor GSP-1 is initiated when the input command buffer appears empty. For an embodiment, this polling continues until the write pointer is updated such that the input command buffer is not empty. For an embodiment, the frequency of polling is made configurable and should be not too frequent (which would create excess traffic) and not too infrequent (which would delay the processing).

For an embodiment, instead of polling, interrupt-based communication between the cascaded GSPs can be established for pointer synchronization. For an embodiment, an interrupt is generated from the first Graph Streaming Processor GSP-0 to the second Graph Streaming Processor GSP-1 every time the write pointer is updated in the command state array.

Figure 5:
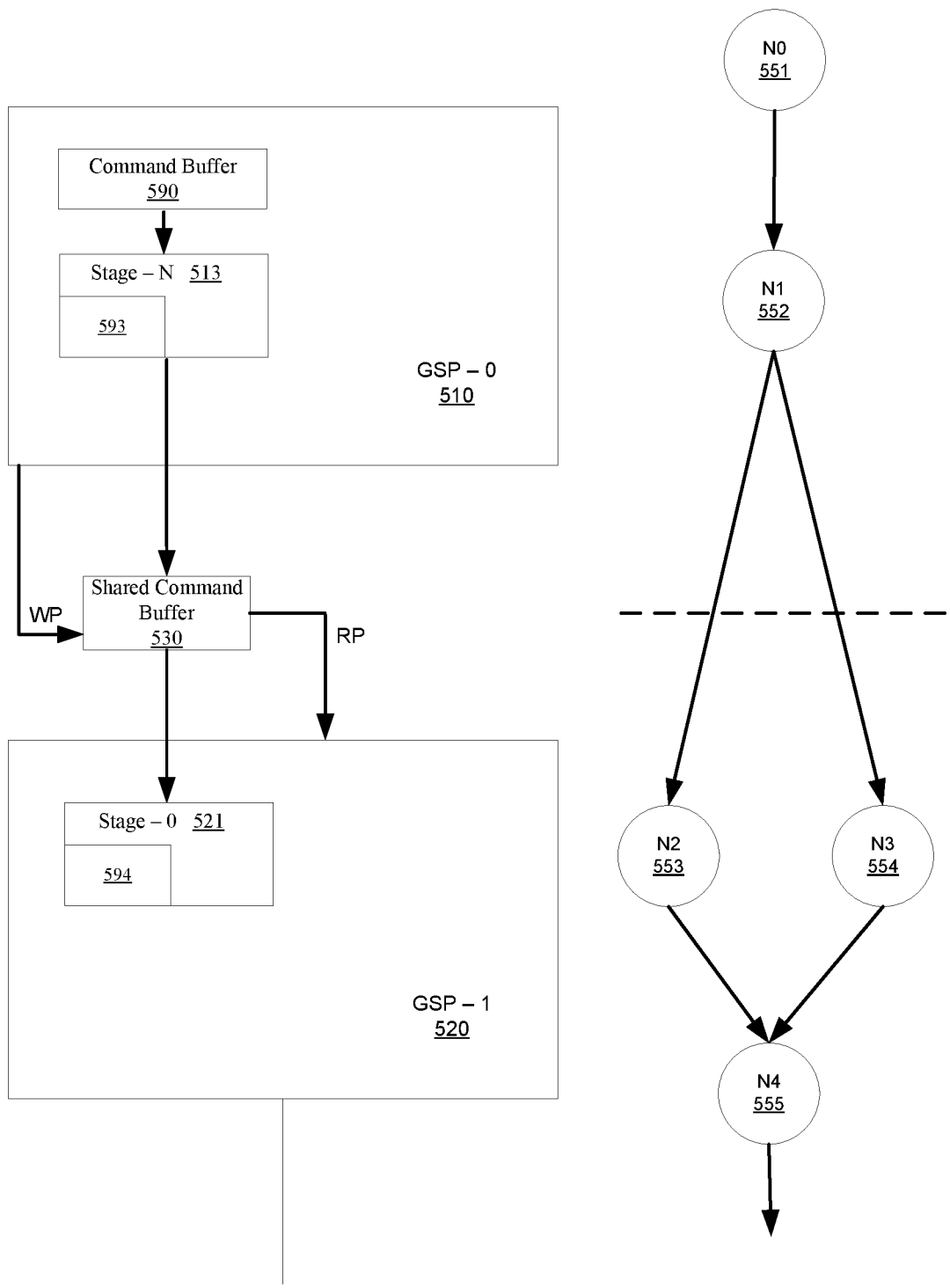
FIG. 5 shows a shared command buffer of cascaded graph streaming processors, according to an embodiment.

FIG. 5 shows a shared command buffer of cascaded graph streaming processors, according to an embodiment. FIG. 5 shows a visual depiction of a relationship between the operation of the cascaded GSPs 510, 520, and an acyclic graph. The acyclic graph progresses over the operation of both of the GSPs 510, 520. A node N0 551 of the acyclic graph corresponds to a stage of the GSP 510 not shown, but this stage generates commands that are stored in the command buffer 590. The stage 513 (corresponding to the node N1 552 of the acyclic graph) of the GSP 510 include hardware that includes the input command buffer parser 593, wherein the input command buffer parser 593 generates the threads of the stage 513 of the first GSP 510 based upon commands of the command buffer 590 located between the stage 513 and the previous stage (the previous stage includes the node N0 551 of the acyclic graph). As previously stated, the command buffer 590 has commands written into it that provides parallel processing and triggers threads for later occurring stages.

The stage-N (531) of the first GSP 510 generates the commands to be stored in a shared command buffer 530.

Further, as shown in FIG. 5, the stage 521 of the second GSP 520 corresponds with the nodes N2 553, N3 554 of the acyclic graph. The stage 521 of the GSP 520 include hardware that includes the input command buffer parser 594, wherein the input command buffer parser 594 generates the threads of the stage 521 of the second GSP 520 based upon commands of the shared command buffer 530 located between the stage 521 of the second GSP and the previous stage 513 of the first GSP 510 (the previous stage includes the node N1 152 of the acyclic graph). As previously stated, the shared command buffer 530 has commands written into it that provides parallel processing and triggers threads for later occurring stages.

The stage 521 of the second GSP 520 generates and stores the commands to be stored in another command buffer that are used by the next stage of the GSP 520 that corresponds with the node N4 555 of the acyclic graph.

FIG. 6 is a flow chart that includes steps of a method of graph stream processing, according to an embodiment. A first step 610 includes scheduling, by a thread manager of each of a plurality of graph streaming processors, a plurality of threads operating on an array of processors of the graph streaming processor. For an embodiment, the scheduling includes a second step 620 that includes interpreting, by an input command buffer parser of each stage of a plurality of physical hardware stages of the thread manager, commands within a corresponding input command buffer located between the stage and a previous stage, and a third step 630 that includes generating the plurality of threads based on the interpreted commands. A shared command buffer is located between each of the plurality of graph streaming processors, wherein the shared command buffer includes a buffer address, a write pointer, and a read pointer. A fourth step 640 includes writing, by a first graph streaming processor of the plurality of graph streaming processors, commands to a first shared command buffer as indicated by the write pointer. A fifth step 650 includes reading, by a second graph streaming processor of the plurality of graph streaming processors, command from the first shared command buffer and indicated by the read pointer, comprising interpreting, by an input command buffer parser of a first physical hardware stage of a thread manager of the second graph streaming processor, commands within the first shared command buffer. A sixth step 660 includes managing the write pointer and the read pointer to avoid overwriting unused commands of the shared command buffer.

As previously described, for an embodiment, the managing of the at least one graph streaming processor scheduler includes providing an indication to the second graph streaming processor that enough commands have been written that the write pointer has progressed over greater than a selected percentage of the shared command buffer.

As previously described, an embodiment further includes reading, by the second graph streaming processor, the write pointer of the shared command buffer, and determining how much of the shared command buffer the second graph streaming processor can process.

As previously described, an embodiment further includes determining, by the second graph streaming processor, how many of all the commands from the read pointer to the write pointer within the shared command buffer the second graph streaming processor can process.

As previously described, an embodiment further includes dispatching, by the second graph streaming processor, threads based on parsing of the shared command buffer, wherein when the second graph streaming processor parses greater than a selected percentage of the shared command buffer, the second graph streaming processor updates the read pointer of the shared command buffer. For an embodiment, updating the read pointer of the shared command buffer enables the first graph streaming processor to only overwrite commands that have been processed by the second graph streaming processor.

As previously described, an embodiment further includes the first graph streaming processor operating to read the read pointer of the shared command buffer when the write pointer matches a current read pointer of the first graph streaming processor, and the shared command buffer appears full.

As previously described, an embodiment further includes writing, by the first graph streaming processor, a terminal index command to the shared command buffer when the processing of the first graph streaming processor is complete.

Figure 7:
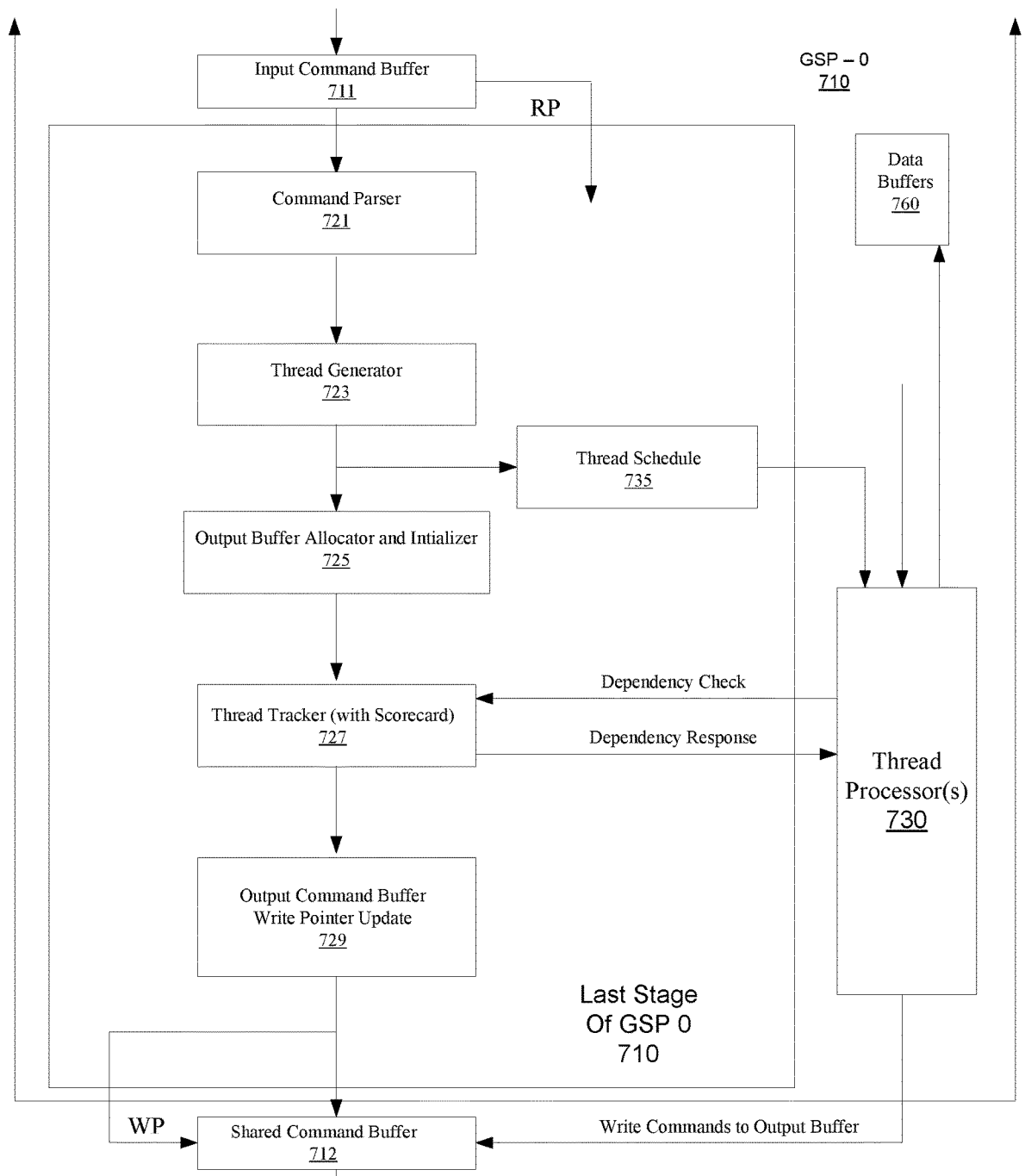
FIG. 7 is a block diagram showing a hardware implementation of a stage of a graph streaming processor, according to an embodiment.

FIG. 7 is a block diagram showing a hardware implementation of a stage of a graph streaming processor, according to an embodiment. More specifically, FIG. 7 shows a hardware implementation of the last stage of the GSP-0 710. The stage receives write command from an input command buffer 711 which is located within the GSP-0 710 before the last stage. A command parser 721 parses the commands from the input command buffer 711. A thread generator 723 receives the parsed commands and generates threads which are provided to the thread processors 730. A thread scheduler 735 schedules processing of the threads by the thread processors 730. An output buffer allocator and Initializer 725 allocates an upper bound on space needed within the shared command buffer 712 for the output commands generated by the thread processors 730 during processing of the threads. A thread tracker 727 provides dependency checking of the threads, and provides a dependency response for the threads during processing. An output (shared) command buffer write pointer update control 729 provides updates to the write point (WP) of the shared command buffer 712 and the write command for the shared command buffer 712 are generated by the thread processors 730 during processing of the threads. The thread processors 730 read and write data to and from data buffers 760.

For an embodiment, each of the functional blocks 721, 723, 725, 727, 729, 735 are implemented in hardware utilizing digital logic gates. That is, the functional blocks are implemented with sequential and combinatorial logic to realize the functionality of the functional blocks 721, 723, 725, 727, 729, 735. As previously described, the implementation of these functional blocks in hardware provides substantial benefits over a software implementation of such functional blocks.

In summary, for at least some embodiments, each of the stages in the thread manager is responsible for scheduling threads for all the nodes at a particular depth (stage) in a corresponding graph. The scheduling is done by parsing an input command buffer which was written into by threads scheduled by the upstream (previous) stage. For an embodiment, the hardware management of the command buffer in each stage includes the forwarding of information required by every stage from the input command buffer to the output command buffer, allocation of the required amount of memory (for the output thread-spawn commands) in the output command buffer before scheduling a thread, clearing the allocated memory with dummy entries, writing the thread-spawn command/s initiated from the thread/s running on the thread processor/s into the output command buffer, and managing the write, completion and read pointers into the command buffers.

The write pointer of the command buffer moves during the clearing of the allocated memory with dummy entries before thread dispatch. The write pointer after the completion of the dummy entry writes becomes the future completion pointer for the next stage. The completion pointer is updated after thread completion but in an in-order fashion. That is, the completion pointer updates sequentially in the same temporal order as the dispatch.

Figure 8:
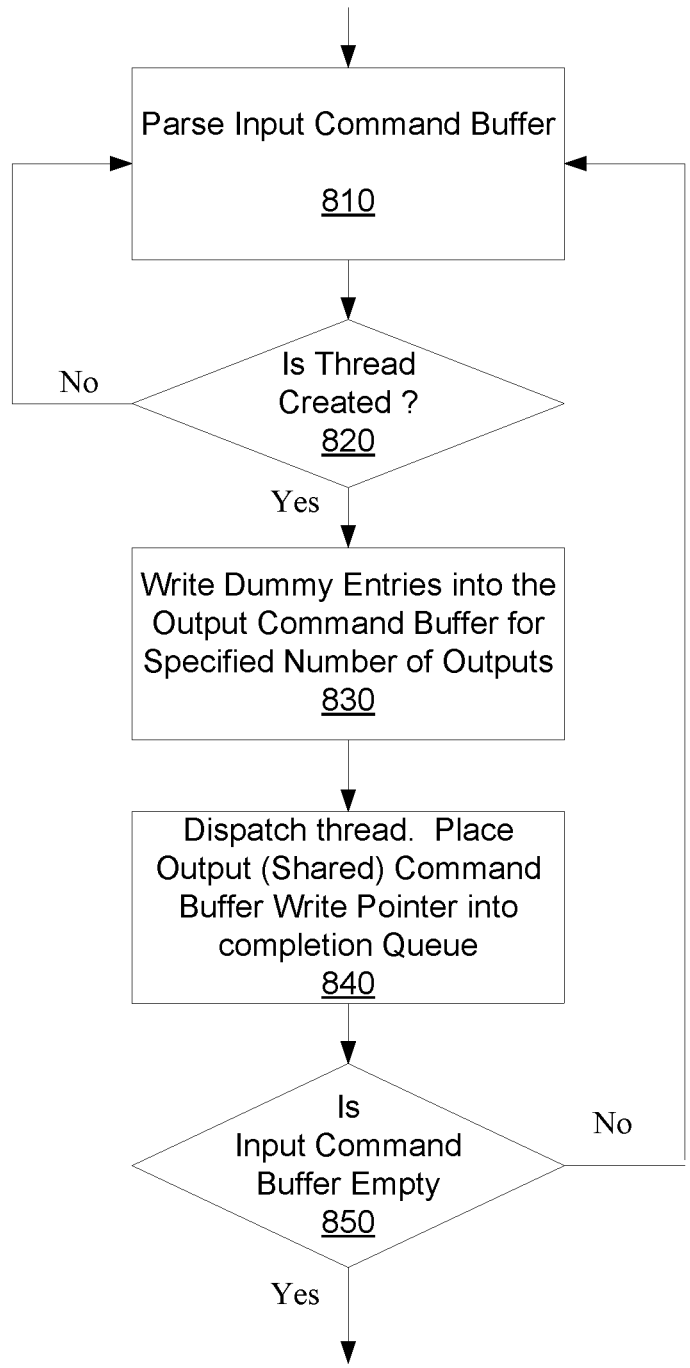
FIG. 8 is a flow chart that includes steps of methods of writing to a command buffer, according to an embodiment.

FIG. 8 is a flow chart that includes steps of methods of writing to a command buffer, according to an embodiment. A first step 810 includes a stage of one of the GSP(s) parsing an input command buffer which can be an internal command buffer or the shared command buffer. A second step 820 includes confirming whether a thread has been generated by the parsing of the command buffer. If not, more parsing of the command buffer takes place. If a thread is created, then for an embodiment, a third step 830 includes writing dummy entries into the output command buffer which can be the shared command buffer for a specified number of outputs. A fourth step 840 includes dispatching the thread to the plurality of processors. Further, the fourth step 840 includes placing the output (including the shared) command buffer write pointer into a completion queue. A first step 850 includes checking whether the input command buffer (which can be the shared command buffer) is empty. If yes, then the stage has completed. If not, parsing of the input command buffer (which can be the shared command buffer) is continued.

Figure 9:
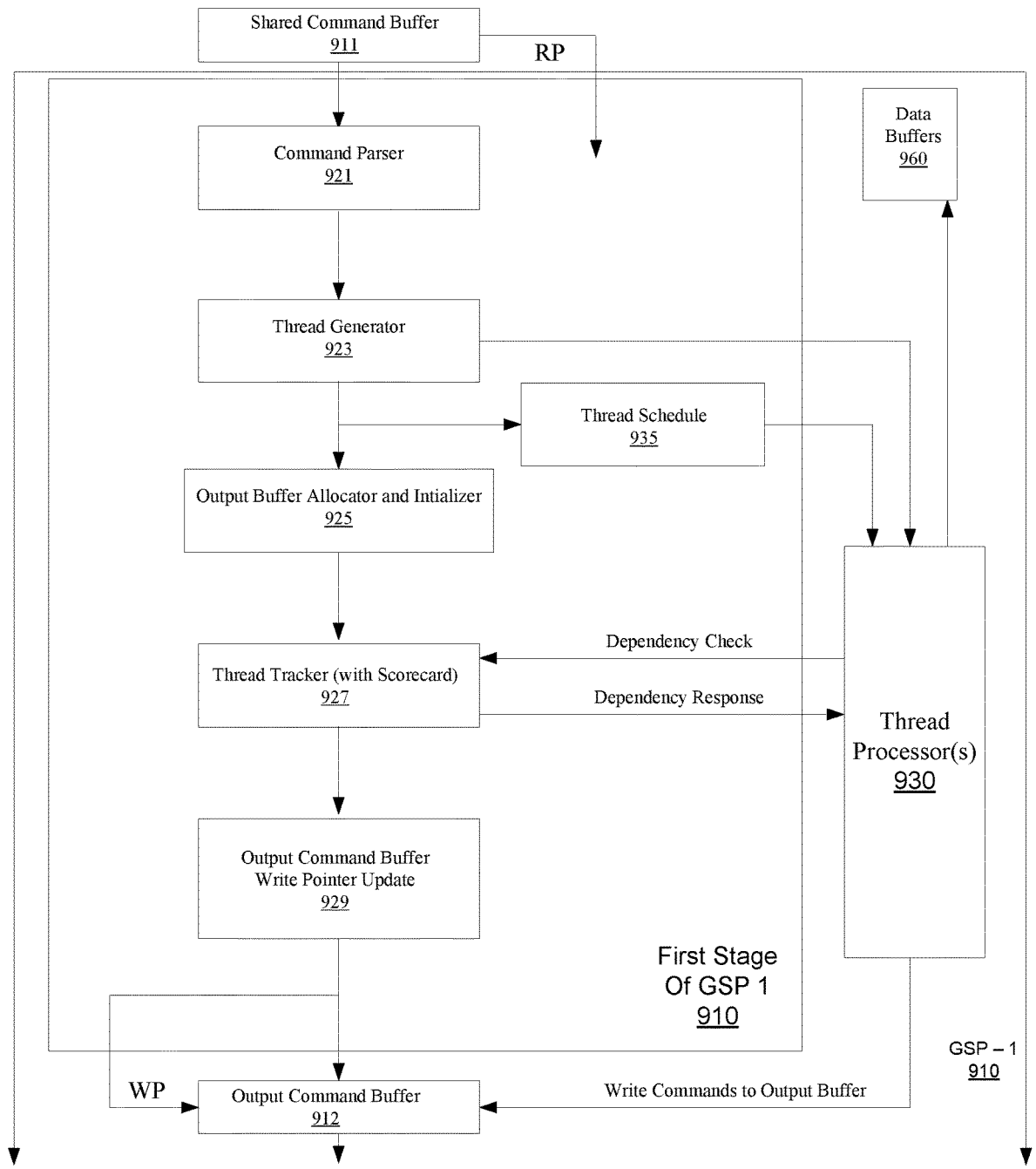
FIG. 9 is a block diagram showing a hardware implementation of a stage of a graph streaming processor, according to another embodiment.

FIG. 9 is a block diagram showing a hardware implementation of a stage of a graph streaming processor, according to another embodiment. More specifically, FIG. 9 shows a hardware implementation of the first stage of the GSP-1 910. The first stage receives write commands from a shared command buffer 911. A command parser 921 parses the commands from the shared command buffer 911. A thread generator 923 receives the parsed commands and generates threads which are provided to the thread processors 930. A thread scheduler 935 schedules processing of the threads by the thread processors 930. An output buffer allocator and Initializer 925 allocates an upper bound on space needed within the output command buffer for the output commands generated by the thread processors 930 during processing of the threads. A thread tracker 927 provides dependency checking of the threads, and provides a dependency response for the threads during processing. An output command buffer write pointer update control 929 provides updates to the write point (WP) of the output command buffer 912 and the write command for the output command buffer 912 are generated by the thread processors 930 during processing of the threads. The thread processors 930 read and write data to and from data buffers 960.

As previously described, for an embodiment, each of the functional blocks 921, 923, 925, 927, 929, 935 are implemented in hardware utilizing digital logic gates. That is, the functional blocks are implemented with sequential and combinatorial logic to realize the functionality of the functional blocks 921, 923, 925, 927, 929, 935. As previously described, the implementation of these functional blocks in hardware provides substantial benefits over a software implementation of such functional blocks.

As previously described, in summary, for at least some embodiments, each of the stages in the thread manager is responsible for scheduling threads for all the nodes at a particular depth (stage) in a corresponding graph. The scheduling is done by parsing an input command buffer which was written into by threads scheduled by the upstream (previous) stage. For an embodiment, the hardware management of the command buffer in each stage includes the forwarding of information required by every stage from the input command buffer to the output command buffer, allocation of the required amount of memory (for the output thread-spawn commands) in the output command buffer before scheduling a thread, clearing the allocated memory with dummy entries, writing the thread-spawn command/s initiated from the thread/s running on the thread processor/s into the output command buffer, and managing the write, completion and read pointers into the command buffers.

Figure 10:
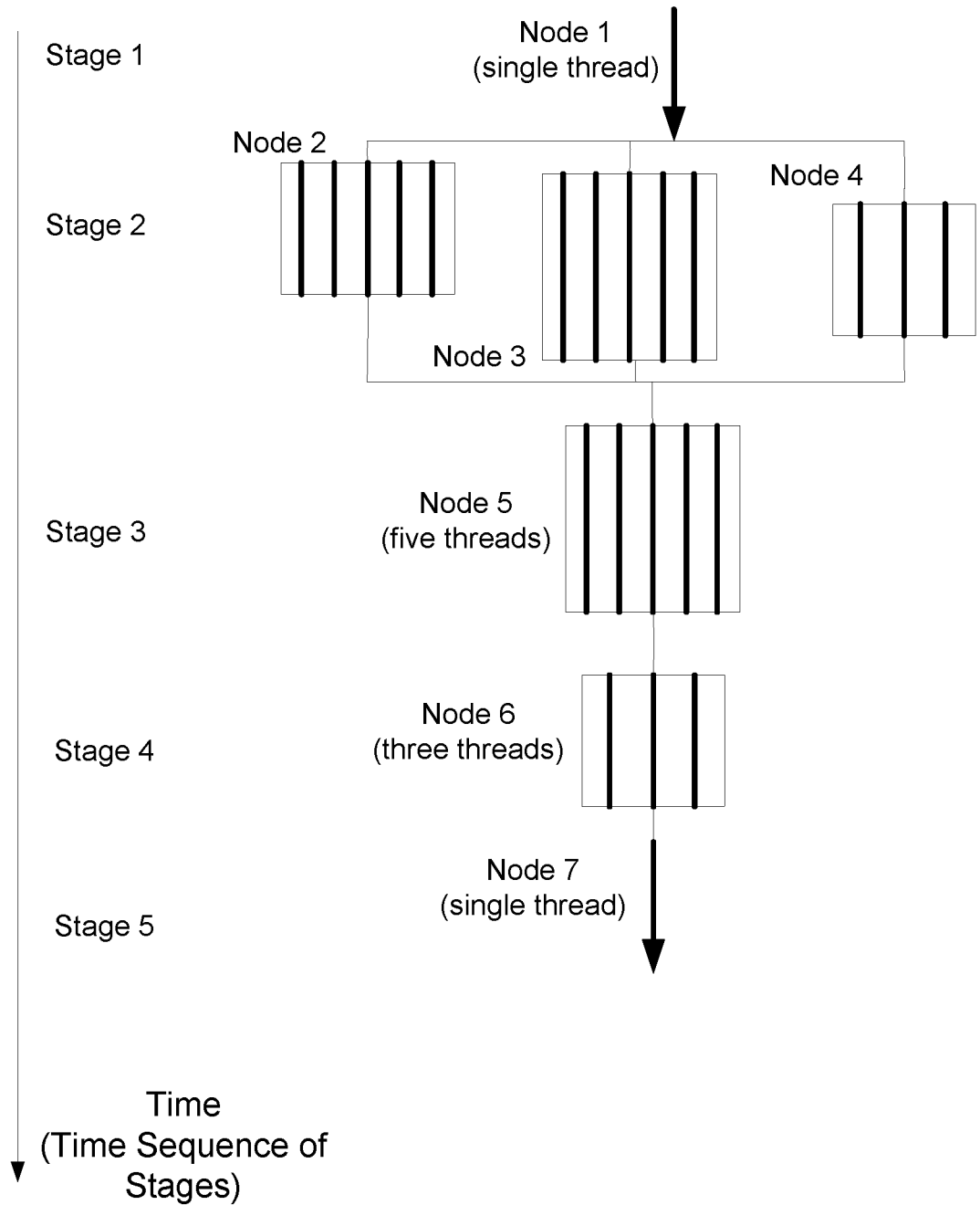
FIG. 10 shows a representation of multiple stages of graph stream processing including multiple threads, according to an embodiment.

FIG. 10 shows a representation of multiple stages of graph stream processing including multiple threads, according to an embodiment. As shown, the multiple stages include, for example, a stage 1, a stage 2, a stage 3, a stage 4, and a stage 5. As described, for an embodiment, the stages cross from one GSP to another GSP through a shared command buffer.

As shown, each of the stages is executed sequentially in time, and threads of each of the stages which are producing data for a thread of a subsequent thread of a subsequent stage are completed before execution of the threads of the next (subsequent) stage. As shown, each of the stages includes one or more nodes, wherein each node includes one or more streams. For an embodiment, a stream includes a code-block operating on the one or more processors of the cascaded graph streaming processors. Further, as previously described, each stage of the cascaded graph streaming processors includes a physical piece of hardware in a thread manager which is responsible for scheduling the threads corresponding to the node/s at a particular depth (as determined by timing of the stage relative to other stages) in the graph. For an embodiment, the stage includes an input command buffer parser, wherein the input command buffer parser generates the threads of the stage based upon commands of a command buffer located between the stage and the previous stage. Further, as described, a node includes one or more code blocks that operate as the stream(s) when executed on the plurality of processors of the graph streaming processor.

As shown in FIG. 10, the stage 1 includes a single node (Node 1) that includes, for example, a single thread operating on the plurality of processors. The stage 2 includes a plurality of nodes (Node 2, Node 3, Node 4), wherein the Node 2 includes 5 thread operating on the plurality of processors, the Node 3 includes 5 threads operating on the plurality of processors, and the Node 4 include 3 threads operating on the plurality of processors. Note that the threads of Nodes 2, 3, 4 start and end at different times within the stage 2. The stage 3 includes Node 5 that include 5 threads, stage 4 includes Node 6 that includes 2 threads, and stage 6 includes Node 7 that includes a single thread.

Although specific embodiments have been described and illustrated, the described embodiments are not to be limited to the specific forms or arrangements of parts so described and illustrated. The embodiments are limited only by the appended claims.

What is claimed:

1. A cascade of graph streaming processors, comprising:
   a plurality of graph streaming processors, wherein each of the graph streaming processor comprises:
      a processor array including a plurality of processors;
      a thread manager, the thread manager comprising a plurality of stages and a plurality of command buffers located between each of the plurality of stages, wherein each stage includes physical hardware operative to schedule each of a plurality of threads of the stage for processing on the processor array, including an input command buffer parser operative to interpret commands within a corresponding input command buffer and generate the plurality of threads;
   the cascade of graph streaming processors further comprising;
   one or more shared command buffers located between each of the plurality of graph streaming processors, wherein each shared command buffer includes a buffer address, a write pointer, and a read pointer; wherein
   for each of the shared command buffers a first graph streaming processor of the plurality of graph streaming processors operates to write commands to the shared command buffer as indicated by the write pointer of the shared command buffer and a second graph streaming processor of the plurality of graph streaming processors operates to read commands from the shared command buffer as indicated by the read pointer by interpreting commands of the shared command buffer by an input command buffer parser of a first stage of the second graph streaming processor;
   wherein for each one of the shared command buffers, at least one graph streaming processor scheduler operates to manage the write pointer and the read pointer to avoid overwriting unused commands of the shared command buffer.

2. The cascade of graph streaming processors of claim 1, wherein the managing of the at least one graph streaming processor scheduler comprises the at least one graph streaming processor scheduler operative to:
   provide an indication to the second graph streaming processor that enough commands have been written that the write pointer has progressed over greater than a selected percentage of the shared command buffer.

3. The cascade of graph streaming processors of claim 1, wherein the second graph streaming processor reads the write pointer of the shared command buffer and determines how much of the shared command buffer the second graph streaming processor can process.

4. The cascade of graph streaming processors of claim 1, wherein the second graph streaming processor determines how much of all the commands from the read pointer to the write pointer within the shared command buffer the second graph streaming processor can process.

5. The cascade of graph streaming processors of claim 1, wherein the second graph streaming processor dispatches threads based on parsing of the shared command buffer, wherein when the second graph streaming processor parses greater than a selected percentage of the shared command buffer, the second graph streaming processor updates the read pointer of the shared command buffer.

6. The cascade of graph streaming processors of claim 5, wherein updating the read pointer of the shared command buffer enables the first graph streaming processor to only overwrite commands that have been processed by the second graph streaming processor.

7. The cascade of graph streaming processors of claim 1, wherein the first graph streaming processor operates to read the read pointer of the shared command buffer when the write pointer matches a current read pointer of the first graph streaming processor, and the shared command buffer appears full.

8. The cascade of graph streaming processors of claim 1, wherein the first graph streaming processor writes a terminal index command to the shared command buffer when the processing of the first graph streaming processor is complete.

9. The cascade of graph streaming processors of claim 1, wherein the physical hardware of at least one of the stages comprises:
   the input command buffer parser operative to interpret the commands within the corresponding input command buffer and generate the plurality of threads; and
   a thread scheduler for scheduling operation of the plurality of threads on the plurality of processors;
   wherein the threads are processed on the plurality of processors.

10. The cascade of graph streaming processors of claim 9, wherein the plurality of processors generates commands that are written into a corresponding one of the one or more shared command buffers.

* * * * *